United States Patent [19]

Kloster

[11] Patent Number: 4,516,303
[45] Date of Patent: May 14, 1985

[54] SPRING COMPRESSOR

[76] Inventor: Kenneth D. Kloster, 6649 Millridge, Maumee, Ohio 43537

[21] Appl. No.: 475,906

[22] Filed: Mar. 16, 1983

[51] Int. Cl.³ .............................................. B23P 19/04
[52] U.S. Cl. ..................................... 29/227; 254/10.5; 74/89.15
[58] Field of Search ......................... 29/227, 225, 238; 254/10.5, 103; 74/424.8 R, 89.15

[56] References Cited

U.S. PATENT DOCUMENTS

| | | | |
|---|---|---|---|
| 1,526,155 | 2/1925 | Kinney | 254/103 |
| 1,535,727 | 4/1925 | Johnson | 254/103 |
| 2,311,972 | 2/1943 | Simpson | 74/89.15 |
| 4,034,960 | 7/1977 | Kloster | 254/10.5 |
| 4,036,473 | 7/1977 | Kloster | 254/10.5 |
| 4,396,047 | 8/1983 | Balkus | 254/103 |

FOREIGN PATENT DOCUMENTS 3021084 12/1981 Fed. Rep. of Germany ..... 254/10.5

Primary Examiner—James L. Jones, Jr.
Attorney, Agent, or Firm—Fraser & Clemens

[57] ABSTRACT

The present invention relates to a helical gear drive assembly which can be utiized as a spring compressor for compressing an associated helical coil spring of the type commonly utilized on MacPherson strut suspension assemblies. The spring compressor includes a pair of elongate parallel threaded guide shafts having an upper spring engaging shoe secured to the upper end thereof and a lower support link secured at their lower ends. The gear drive assembly is mounted on the guide shafts intermediate the upper spring engaging shoe and the lower support link and is utilized to support a lower spring engaging shoe in spaced apart, facing relationship with the upper spring engaging shoe. Both the upper and lower spring engaging shoes can be formed of a helical configuration to provide positive engagement with the respective coils of the spring. The helical drive assembly includes a separate internally threaded sleeve mounted within a housing about each of the threaded guide shafts. The sleeves are mounted within the housing to permit rotational movement of the sleeves, but prevent any axial movement of the sleeves relative to the housing along the associated guide shaft. A helical drive arrangement is provided for simultaneously rotating the two sleeves to cause the helical gear assembly to move along the guide shafts.

5 Claims, 3 Drawing Figures

SPRING COMPRESSOR

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact component of a vehicle suspension system. The MacPherson strut suspension system is disclosed in more detail in U.S. Pat. No. 2,624,592 to E. S. MacPherson.

One of the problems associated with MacPherson strut assemblies is related to the replacement of a worn shock absorber unit. One solution to this problem is to manufacture the MacPherson strut assembly with a construction which permits the shock absorber to be readily removed and replaced with a new shock absorber. However, such a repair procedure can be relatively time consuming, since typically the entire strut assembly must be removed from the vehicle.

One solution to reducing the time associated with repairing a MacPherson strut assembly is disclosed in U.S. Pat. No. 4,034,960 to K. D. Kloster. The Kloster patent discloses a pneumatically operated spring compressor which can be utilized to repair a strut assembly while the lower portion of the assembly remains attached to the vehicle. However, the economics of such a compressor can typically only be justified by repair shops which frequently repair strut suspension systems.

Smaller repair shops typically utilize a mechanically-actuated spring compressor of the type manufactured by Warren, Inc. of Jonesboro, Ark. This type of spring compressor includes a pair of spaced apart U-shaped hooks which are maintained in a facing relationship by means of an elongate bolt. In operation, typically two or three of the compressor units are circumferentially spaced about the coil spring and the bolts are alternately tightened to move the U-shaped hooks toward one another, thereby compressing the spring.

Another type of mechanically-actuated spring compressor is disclosed in U.S. Pat. No. 4,219,918 to Klann. The Klann patent discloses a spring compressor having a hollow guide tube and a threaded spindle rotatably mounted in the tube. A first spring engaging shoe is secured to one end of the guide tube, while a second spring engaging shoe is mounted on a sleeve which is slidable along the guide tube. The sleeve threadedly engages the spindle such that rotation of the spindle causes movement of the second spring shoe along the guide tube.

SUMMARY OF THE INVENTION

The present invention relates to a spring compressor which utilizes a helical gear drive assembly and a pair of spaced apart spring engaging shoes to compress an associated helical coil spring of the type typically utilized in a MacPherson strut suspension system. The spring compressor includes a pair of elongate parallel threaded guide shafts having an upper spring engaging shoe secured to the upper ends thereof and a lower support link secured to the lower ends. The helical gear drive assembly is mounted on the threaded guide shafts intermediate the upper spring engaging shoe and the lower support link. A lower spring engaging shoe is mounted on the gear drive assembly in spaced apart, facing relationship with the upper spring engaging shoe. Preferably, the upper and lower spring engaging shoes are each formed with a helical configuration to provide positive engagement with respective coils of the associated spring.

The helical gear drive assembly includes a housing mounted for axial movement along the guide shafts. An input shaft is rotably mounted in the housing and is positioned between and in perpendicular relationship with the two parallel threaded guide shafts. The input shaft is adapted to be driven by a conventional ratchet wrench or a pneumatic power tool. An input helical drive gear is secured about the input shaft and is coupled to a pair of helical driven gears mounted about the threaded guide shafts. The pair of helical driven gears are each secured to an internally threaded sleeve adapted to threadedly receive a respective one of the threaded guide shafts. Means are provided for permitting rotational movement of the sleeves about the associated guide shafts and resisting axial movement of the sleeves along the guide shafts relative to the housing.

Since rotation of the input helical drive gear in one direction causes the helical driven gears to rotate in opposite directions, one of the guide shafts is provided with right-hand threads while the other one of the guide shafts is provided with left-hand threads. As the input shaft and the associated input helical drive gear is rotated in one direction, the rotation of the helical driven gears along with the associated internally threaded sleeves causes the gear drive assembly to move upwardly along the guide shafts and thus advance the lower spring engaging shoe toward the upper spring engaging shoe. When the input shaft is rotated in an opposite direction, the gear drive assembly is caused to move downwardly along the guide shafts and thus move the spring engaging shoes away from one another.

BRIEF DESCRIPTION OF THE DRAWINGS

The above, as well as other advantages and features of the invention, will become readily apparent to one skilled in the art from reading the following detailed description of the invention when considered in light of the accompanying drawings, in which.

DESCRIPTION OF THE PREFERRED EMBODIMENT

Figure 1:
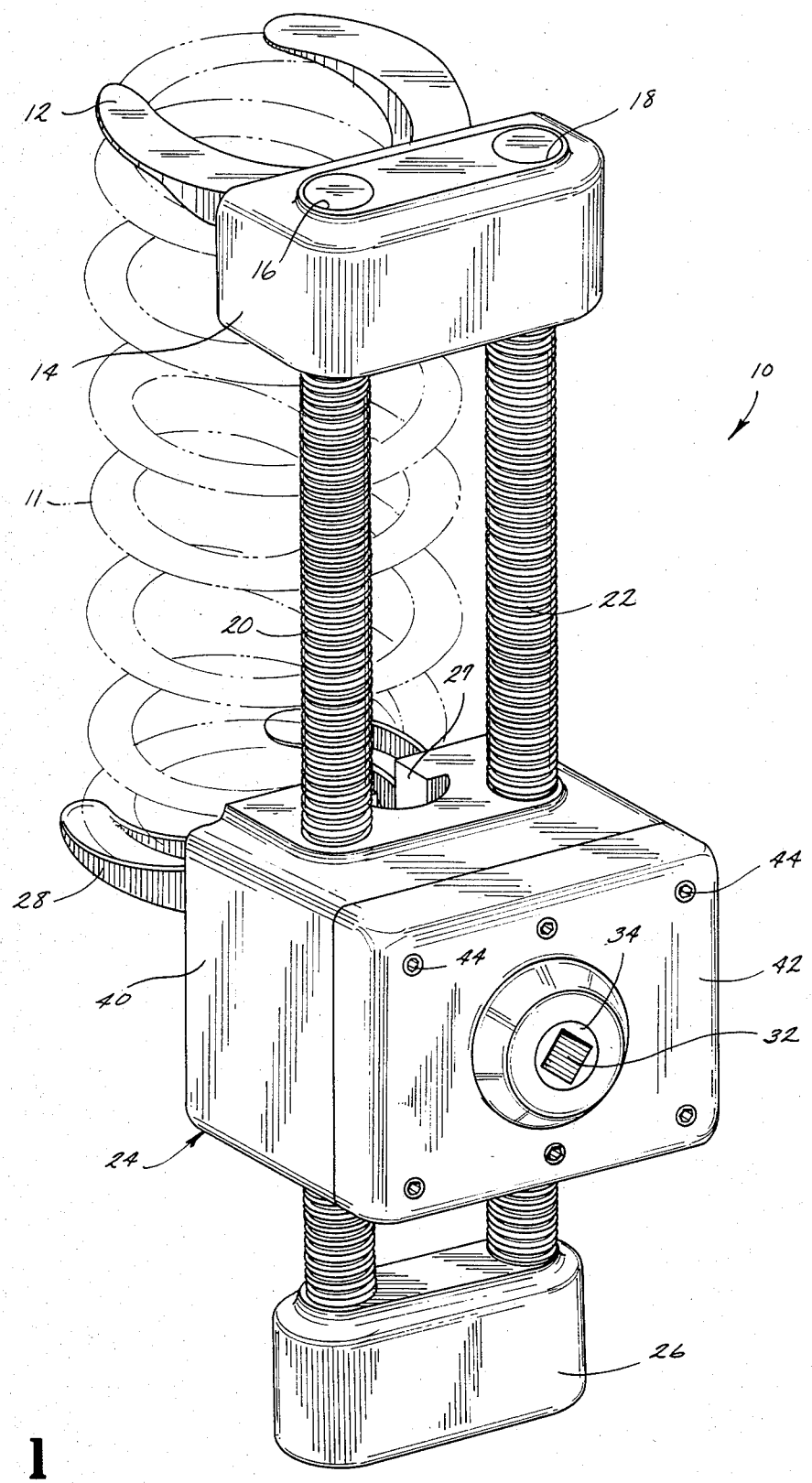
FIG. 1 is a perspective view of a spring compressor utilizing a helical gear drive assembly according to the present invention.

Referring to FIG. 1, there is shown a spring compressor 10 including a helical gear drive assembly 24 incorporating the features of the present invention. The spring compressor 10 can be utilized to compress a helical spring 11 of the type commonly found on MacPherson strut suspension assemblies. The spring compressor 10 includes an upper spring engaging shoe 12 which is secured to an associated support 14. The support 14 has spaced apart parallel apertures 16 and 18 formed therein for receiving and securely supporting the upper ends of a pair of elongate parallel threaded guide shafts 20 and 22, respectively. The threaded guide shafts 20 and 22 extend through the gear drive assembly 24 and are secured at their lower ends by a lower support link 26. As will be discussed, the gear drive assembly 24 includes a T-nut slot 27 for securely supporting a lower spring engaging shoe 28. By utilizing a pair of elongate guide shafts, the spring engaging shoes 12 and 28 are maintained in longitudinal alignment with one another.

As shown in FIG. 1, the upper spring engaging shoe 12 and the lower spring engaging shoe 28 are formed of a helical configuration to provide positive engagement with the respective coils of the spring 11. A more detailed discussion of the construction and advantages of the helical spring engaging shoes can be found in U.S. Pat. No. 4,034,960 issued to K. D. Kloster and incorporated herein by reference. The above-noted patent also discloses the manner in which a T-nut configuration can be utilized to releasably secure the shoes 12 and 28 to the upper support 14 and the gear drive assembly 24 respectively. In addition, the above-noted patent further discloses (in FIGS. 15-17 of the patent) a lower clamping adapter which can be utilized to replace the lower shoe 28 and clamp directly to the shock absorber housing portion located below the lower spring platform of a MacPherson strut assembly.

As will be discussed, the helical gear drive assembly 24 includes a socket connection point 32 at the end of an input shaft 34 which is adapted to be connected to a conventional ratchet wrench or a pneumatic power tool. When the associated wrench rotates the input shaft 34 in one direction, the helical gear assembly will move upwardly along the guide shafts 20 and 22, thereby causing the spring engaging shoes 12 and 28 to move toward one another. When the associated wrench rotates the inut shaft 34 in an opposite direction, the helical gear drive assembly will move downwardly along the shafts 20 and 22.

Figure 2:
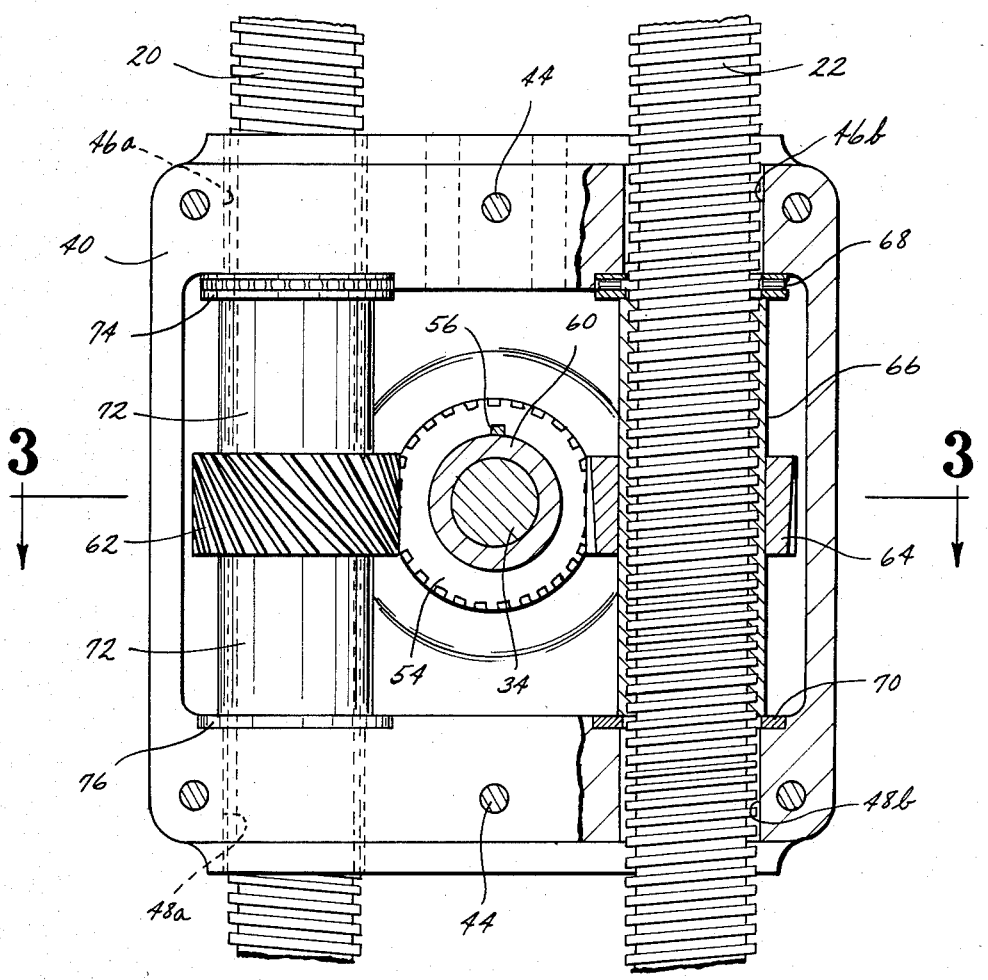
FIG. 2 is a sectional view of the helical gear drive assembly of FIG. 1.
Figure 3:
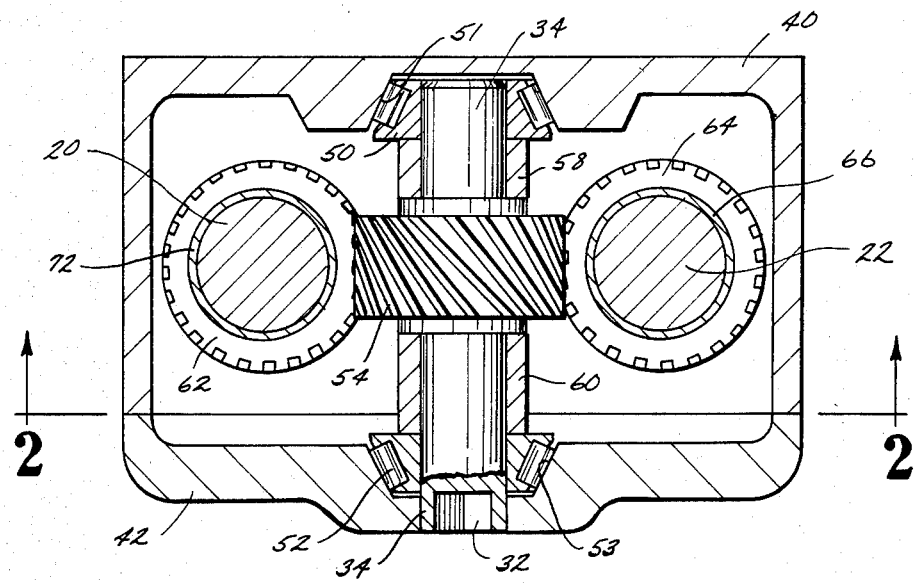
FIG. 3 is a sectional view of the gear drive assembly taken along the line 3—3 of FIG. 2.

The helical gear drive assembly 24 is shown in more detail in FIGS. 2 and 3. Referring to these figures, the gear drive assembly 24 includes an outer housing 40 having a front cover 42 fastened thereto by a plurality of threaded bolts 44. The housing 40 has upper apertures 46a and 46b and lower apertures 48a and 48b formd therethrough for slidably receiving the threaded guide shafts 20 and 22 respectively.

The rotatable input shaft 34 of the helical gear drive assembly 24 has one end supported by a tapered roller bearing 50 positioned within a tapered seat 51 formed in the rear wall of the housing 40, and an opposite end supported by another tapered roller bearing 52 positioned within a tapered seat 53 formed on the inner face of the front cover 42. An input helical drive gear 54 is coaxially positioned about the input shaft 34 and is secured thereto by means of a key 56. A pair of spacer sleeves 58 and 60 are mounted about the shaft 34 between the drive gear 54 and the bearings 50 and 52 respectively.

The helical drive gear 54 is coupled to a pair of individual helical driven gears 62 and 64 which are coaxially positioned about the guide shafts 20 and 22 respectively. The helical driven gear 64 is secured to an internally threaded sleeve member 66 which is adapted to threadedly receive the guide shaft 22. The sleeve member 66 and the associated heilcal driven gear 64 are permitted to rotate about the axis of the guide shaft 60 within the housing 40, but are prevented from moving axially along the guide shaft relative to the housing 40 by means of an upper thrust bearing 68 positioned between the upper end of the sleeve 66 and the lower face of the top wall of the housing 40, and a lower thrust washer 70 positioned between the lower end of the sleeve 66 and the upper face of the bottom wall of the housing 40. Similarly, the helical driven gear 62 is secured to an internally threaded sleeve member 72 which threadedly receives the guide shaft 20. A thrust bearing 74 is positioned between the upper end of the sleeve 72 and the housing 40 while a lower thrust washer 76 is positioned between the lower end of the sleeve 72 and the housing 40.

Since rotation of the input shaft 34 and the associated input helical drive gear 54 causes one of the helical driven gears 62 and 64 to rotate about its associated guide shaft in one direction and causes the other one of the helical driven gears 62 and 64 to rotate about its associated guide shaft in an opposite direction, the guide shafts 20 and 22 and the respective sleeves 72 and 66 are formed with opposite direction threads, i.e., one guide shaft and its associated sleeve are formed with right-hand threads while the other guide shaft and its associated sleeve are formed with left-hand threads. Thus, when the input shaft 34 and the associated helical drive gear 54 is rotated in one direction, the helical driven gears and their associated sleeves will cause the housing 40 to move in one direction along the guide shafts 20 and 22 and advance the spring engaging shoes 12 and 28 toward one another. When the input shaft is rotated in an opposite direction, the housing 40 will move in an opposite direction along the guide shafts 20 and 22 and move the spring engaging shoes away from one another.

Although the preferred embodiment of the invention has been described with respect to use of the helical gear drive assembly as a helical spring compressor, it will be appreciated that there are other applications which can utilize the above-described drive mechanism. Accordingly, the present invention encompasses an apparatus utilizing a helical gear drive assembly having a load engaging means for moving a load in a linear path along an elongate guide member.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope.

What is claimed is:

1. An apparatus for compressing a helical coil spring comprising:
   a pair of spaced apart spring engaging shoes for receiving spaced apart helical portions of the spring;
   a pair of spaced apart elongate externally threaded guide shafts each having a longitudinal axis;
   means for mounting said guide shafts in spaced apart, generally parallel relationship and for preventing rotative movement of said guide shafts;
   means for securely mounting one of said spring engaging shoes relative to said guide shafts; and
   means for supporting the other one of said spring engaging shoes in facing relationship with said one shoe, said support means including a housing mounted for axial movement along said guide shafts and a separate internally threaded sleeve threadedly mounted about each of said guide shafts, means for resisting axial movement of each of said sleeves along said guide shafts relative to said housing, and rotatable input means for simultaneously rotating said sleeves relative to said housing about the longitudinal axes of said guide shafts whereby rotation of said input means in one direction causes said support means to move along said guide shafts in one direction and rotation of said input means in an opposite direction causes said support means to move along said guide shafts in an opposite direction.

2. The apparatus according to claim 1 wherein at least one of said shoes includes a spring receiving channel formed of a helical configuration.

3. An apparatus according to claim 1 wherein said rotatable input means includes an input shaft rotatably mounted in said housing, an input drive gear coaxially secured about said input shaft, and a separate driven gear secured to each of said sleeves and coupled to said input drive gear whereby rotation of said input shaft and said input drive gear causes rotation of said driven gears and said sleeves.

4. An apparatus according to claim 3 wherein said input shaft is mounted to rotate about an axis generally perpendicular to the longitudinal axes of said guide shafts.

5. An apparatus according to claim 1 wherein said support means includes a thrust bearing mounted between said housing and one end of said sleeve.

* * * * *